R. GUILLERY.
COMPENSATING DEVICE FOR VEHICLE SUSPENSION.
APPLICATION FILED MAR. 2, 1915.
1,214,912.                                              Patented Feb. 6, 1917.
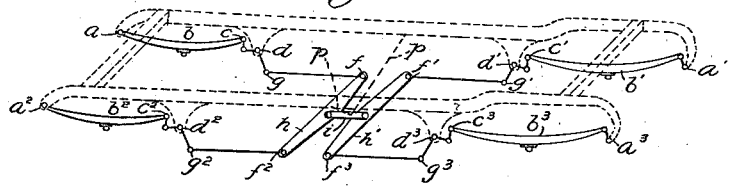
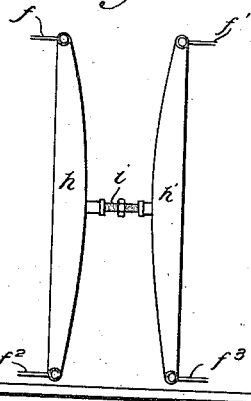
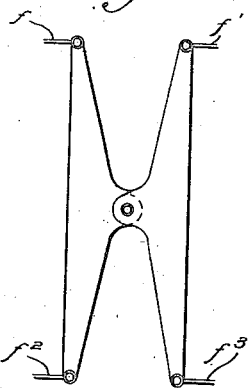
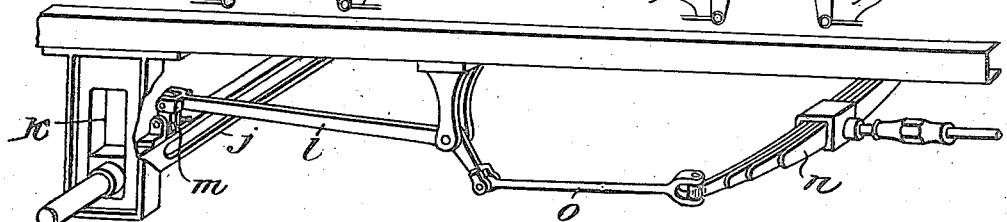
Attest:
E. M. Hamilton
Ew. R. Toleon
Inventor:
Rene Guillery.
by Spear, Middleton, Donaldson & Spear
Attys.

UNITED STATES PATENT OFFICE.

RENÉ GUILLERY, OF AUBERVILLIERS, FRANCE, ASSIGNOR TO SOCIETE DES ETABLISSEMENTS MALICET & BLIN, OF AUBERVILLIERS, FRANCE.

COMPENSATING DEVICE FOR VEHICLE SUSPENSION.

1,214,912.   Specification of Letters Patent.   Patented Feb. 6, 1917.

Application filed March 2, 1915. Serial No. 11,502.

*To all whom it may concern:*

Be it known that I, RENÉ GUILLERY, a citizen of the French Republic, residing in Aubervilliers, in France, have invented certain new and useful Improvements in Compensating Devices for Vehicle Suspension, of which the following is a specification.

This invention relates to improvements in or modifications of that described in United States Patent No. 1,075,415 filed March 25th, 1913. This patent describes a link connection coupling together the arms of oscillating levers pivoted to the frame and connected to the corresponding ends of the suspension springs. The connection between the oscillating levers consisted of cables or rods combined with chains passing over a system of rollers, so that the four suspension springs of the vehicle were coupled to each other; the strains or shocks received by one of them, being transmitted to the other three by the link connection.

The present invention comprises a modified construction of this prior compensation device, the set of rollers being replaced by two swing-bars arranged transversely of the longitudinal axis of the car. These swing-bars which are pivoted relatively to each other, are free to move when their ends are pulled by the cables or other equivalent elements of the suspension terminating at the bell crank levers supporting the ends of the springs of one and the same axle.

In the accompanying drawings,

Figure 1 shows diagrammatically in perspective the whole of the suspension,

Figs. 2 and 3 show in plan two methods of pivoting together the swing-bars.

And Fig. 4 is a perspective view showing a modification.

As stated above, the invention chiefly consists in doing away with the transverse loops formed by each element of the link connection, in order to enable them, as well as the four springs of the suspension, to be connected and coupled together. In this way the rollers connecting together the said loops, are done away with.

Two swing-bars $f$ $f^2$, $f^1$ $f^3$ are arranged transversely of the longitudinal axis of the vehicle, like the loops of the connection described in the above-mentioned prior patent. The said swing-bars $f$ $f^2$, $f^1$ $f^3$ are connected together by a central joint which may be adjustable, and their ends are respectively attached to the cables or other equivalent elements of the suspension, terminating at the bell crank levers $d$ $d^2$ and $d^1$ $d^3$ which support the ends of the springs of one and the same axle.

The whole of the two swing-bars $f$ $f^2$, $f^1$ $f^3$ are thus suspended in space by the tension of the cables connecting them to the bell crank levers supporting the springs.

As the swing-bars $f$ $f^2$, $f^1$ $f^3$ are free and can oscillate about their pivot, which in its turn is adjustable relatively to the frame of the vehicle, it will be readily understood that the working of this arrangement is equivalent to that of the device described in the prior patent.

In the form of the invention shown in Figs. 1 and 2, the swing-bars $f$ $f^2$ $f^1$ $f^3$ are pivoted to the pins $h$ $h^1$ belonging to an adjustment turn-buckle $i$ similar to that holding the supporting shackles of the central rollers $h$ $h^1$ in the arrangement described in the prior patent.

The construction in Fig. 3 shows that the two hinge points of the swing-bars may coincide, the adjustment turn-buckle being then done away with.

In the event of the suspension springs of the vehicle being too stiff, the swing-bars $f$ $f^2$, $f^1$ $f^3$ may consists of spring blades, the pivot pins $h$ $h^1$ of the turn buckle being then replaced by suitable shackles. The ordinary axle springs could moreover be done away with, the elastic part of the arrangement being constituted by the elastic swing-bars.

This arrangement is shown in Fig. 4. The axles $j$ are guided vertically in guides $k$, and bell-crank levers $l$ are connected to the axles by short links $m$ and to the elastic swing-bars $n$ by links $o$. The elastic swing-bars are constituted by leaf-springs, as shown.

This substitution of elastic bars for rigid swing-bars could be effected with a view to avoid the breaking of the latter.

The swing-bars are preferably supported and prevented from swinging in an undesirable manner by means of flexible cables $p$ (Fig. 1) or they could be supported in any other suitable way.

What I claim as my invention and desire to secure by Letters Patent is:—

1. A spring suspension for vehicles comprising in combination a plurality of suspension springs, a plurality of bell-crank levers each supporting one end of a spring, two swing-bars pivoted to each other and extending transversely of the vehicle, and connections between the ends of each swing-bar and the free ends of each pair of bell-crank levers.

2. A spring suspension for vehicles comprising in combination a plurality of suspension springs, a plurality of bell-crank levers each supporting one end of a spring, an adjustable turn-buckle, two swing-bars pivoted to the ends of said turn-buckle and extending transversely of the vehicle, connections between the ends of each swing-bar and the free ends of each pair of bell-crank levers, and a connection between the swing-bars and the vehicle adapted to prevent undesirable movements.

3. A spring suspension for vehicles comprising in combination a plurality of bell-crank levers each supporting a wheel, two blade springs pivoted to each other and extending transversely of the vehicle, and connections between the ends of each blade-spring and the free ends of each pair of bell-crank levers.

In testimony whereof I have signed my name to this specification in the presence of two subscribing witnesses.

RENÉ GUILLERY.

Witnesses:
VICTOR DUPONT,
DE WITT C. POOLE, Jr.